United States Patent
Linnartz

(10) Patent No.: US 10,141,792 B2
(45) Date of Patent: Nov. 27, 2018

(54) POWER HARVESTING CIRCUIT AND METHOD

(71) Applicant: PHILIPS LIGHTING HOLDING B.V., Eindhoven (NL)

(72) Inventor: Johan-Paul Marie Gerard Linnartz, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 194 days.

(21) Appl. No.: 15/322,667

(22) PCT Filed: Jun. 24, 2015

(86) PCT No.: PCT/EP2015/064171
§ 371 (c)(1),
(2) Date: Dec. 28, 2016

(87) PCT Pub. No.: WO2016/001020
PCT Pub. Date: Jan. 7, 2016

(65) Prior Publication Data
US 2017/0141619 A1    May 18, 2017

(30) Foreign Application Priority Data
Jul. 4, 2014    (EP) .................................... 14175783

(51) Int. Cl.
*H02J 50/20* (2016.01)
*H02J 50/10* (2016.01)
*H02J 50/05* (2016.01)
*H02J 7/02* (2016.01)
*H02J 50/40* (2016.01)
*H02J 7/00* (2006.01)
*H02J 7/34* (2006.01)

(52) U.S. Cl.
CPC .............. *H02J 50/20* (2016.02); *H02J 7/007* (2013.01); *H02J 7/025* (2013.01); *H02J 50/05* (2016.02); *H02J 50/10* (2016.02); *H02J 50/40* (2016.02); *H02J 7/345* (2013.01)

(58) Field of Classification Search
CPC .. H02J 50/05; H02J 50/10; H02J 50/20; H02J 50/40
See application file for complete search history.

(56) References Cited

U.S. PATENT DOCUMENTS 8,115,597 B1 * 2/2012 Oliver ................ G06K 19/0713
235/375
8,446,179 B2   5/2013 Maeda et al.
(Continued)

OTHER PUBLICATIONS

Y. Wu, et al., "Modeling of RF Energy Scavenging for Batteryless Wireless Sensors with Low Input Power", Personal Indoor and Mobile Radio Communications (PIMRC), 2013 IEEE 24th International Symposium on Sep. 8-11, 2013.
(Continued)

*Primary Examiner* — Jeffrey Shin

(57) ABSTRACT

A circuit for use in a power harvesting system provides signals from at least first and second antennae to a summing node through respective diodes. The summing node is coupled to an output node through an output diode, and an output capacitor is provided at the output node. This implements combination of antenna signals within a rectification circuit.

16 Claims, 5 Drawing Sheets

(56) References Cited

U.S. PATENT DOCUMENTS

| | | |
|---|---|---|
| 2008/0149738 A1 | 6/2008 | Fujita et al. |
| 2009/0271048 A1 | 10/2009 | Wakamatsu |
| 2010/0301669 A1 | 12/2010 | Lawrence et al. |
| 2011/0242863 A1 | 10/2011 | Park et al. |
| 2011/0285511 A1* | 11/2011 | Maguire ............ G06K 19/0724 340/10.1 |
| 2012/0106103 A1 | 5/2012 | Nohra |
| 2012/0169569 A1 | 7/2012 | Roberts |
| 2012/0292993 A1 | 11/2012 | Mettler et al. |
| 2012/0299396 A1 | 11/2012 | Baden et al. |
| 2014/0001876 A1 | 1/2014 | Fujiwara et al. |
| 2014/0183947 A1 | 7/2014 | Chandler et al. |

OTHER PUBLICATIONS

J-P. Curty, et al., "A model for u-Power Rectifier Analysis and Design", IEEE Transactions on Circuits and Systems—I: Regular Papers, vol. 52, No. 12, Dec. 2005, pp. 2771-2779.

H. Gao, et al., "System Analysis and Energy Model for Radio-Triggered Battery-less Monolithic Wireless Sensor Receiver", University of Technology, Eindhoven, the Netherlands, one page.

* cited by examiner

POWER HARVESTING CIRCUIT AND METHOD

CROSS-REFERENCE TO PRIOR APPLICATIONS

This application is the U.S. National Phase application under 35 U.S.C. § 371 of International Application No. PCT/EP2015/064171, filed on Jun. 24, 2015, which claims the benefit of European Patent Application No. 14175783.1, filed on Jul. 4, 2014. These applications are hereby incorporated by reference herein.

FIELD OF THE INVENTION

This invention relates to power harvesting circuits.

BACKGROUND OF THE INVENTION

Power harvesting relates to the capture of electromagnetic energy from the environment. Examples of electronic circuits which can be powered from the environment include sensor systems that occasionally need to read a sensor value, and identifier circuits that respond to a challenge by sending out an ID, or an authentication signal.

It is usually difficult to harvest enough energy for free from the environment, other than for extremely low power circuits. In general a power signal is instead sent to the circuit to actively load it with energy. RFID tags are an example of this approach.

There are however circuits which potentially could operate based on energy harvesting, making use of a power harvesting antenna, in which the required amount of energy is very small. US20120299396A1 discloses such a power harvesting solution. In an energy harvesting system, the energy gathered by a single antenna may typically be inadequate. Hence multiple antennae can be used to increase the total harvested energy.

A power harvesting circuit typically comprises an antenna, a rectifier circuit and an energy storage capacitor.

It is known that the DC output power of known rectifier circuit designs scales quadratically with the input power at low power levels, because of the dominant 2nd order term in the Taylor expansion of the rectifier transfer function for small signals. This is explained in the paper "Modeling of RF energy scavenging for batteryless wireless sensors with low input power, by Yan Wu; Dept. of Electr. Eng., Eindhoven Univ. of Technol. (TU/e), Netherlands; Linnartz, J.-P.; Hao Gao; Matters-Kammerer, M. K. Published in: Personal Indoor and Mobile Radio Communications (PIMRC), 2013 IEEE 24th International Symposium on 8-11 Sep. 2013.

For this reason, for multiple antenna systems it is not attractive to rectify the power from each antenna individually and then sum the energy from all branches. Instead, it is more effective first to combine the antenna signals and then to rectify.

However, just combining the signals may lead to the undesirable situation that for some phase angles at which the power comes in, the signals at the antennae will cancel each other. It is unavoidable that such cancellation can occur.

FIG. 1 shows a known energy scavenging receiver. It consists of a receive antenna 10, a matching network 12 that maximizes power transfer from the antenna, an RF to DC rectifier 14 and an energy storage device 16 such as a capacitor or rechargeable battery that that stores the energy. A crucial part of the receiver is the RF-DC rectifier 14. One example shown in FIG. 1 is a Dickson charge pump structure, that converts the received RF energy into a DC form suitable for storage. The basic building block of a Dickson charge pump is a Greinacher voltage doubler 18.

The input to the voltage doubler 18 is a sinusoidal wave $r(t)=A \sin(2\pi fct)$, where A is the amplitude and fc is the center frequency. In the ideal case, when A is large enough, the equilibrium voltage on the output capacitor C of the voltage doubler would be 2A. Since the energy stored in a capacitor is $E=\frac{1}{2}CV^2$, the energy scavenged by the voltage doubler is proportional to $A^2$. For applications in wireless sensors, A is usually small due to limited transmission power and large propagation loss. The stored energy is thus proportional to $A^4$.

This fourth power is a very severe limitation to making the rectifier efficient when operating at low input powers. If the input signal A is very weak the rectifier becomes very inefficient. In fact the current versus voltage characteristic of any diode acts as almost a straight line near the zero point (V=0 Volt, I=0 Amp). Hence for very weak signals the diode acts more as a resistor with a linear V-I characteristic, and fails to have a rectifying behaviour. That rectification can only work if the V-I characteristic is large enough to experience the higher order non-linear terms of the V-I characteristic.

For small voltages, significantly below the threshold the diode current can be modelled according to a second order series expansion:

$$I=aV+bV^2$$

There has been a lot of research into designing power harvesting circuits in such a way that they can handle very high frequencies (even as high as several or several tens of GHz) and very low input voltages.

This invention is aimed at the problem of harvesting energy from multiple antennae.

There are known circuits which combine antenna signals, for example beam steering and maximum ratio combining systems used in communications and radar systems. These techniques aim at improving the signal strength by phase shifting the signals from all antennae such that they are in phase and add coherently, that is constructively, such that the voltages add up. In a maximum ratio combining system, not only the phases but also the amplitudes are adjusted to optimise the signal to noise ratio. For a system with multiple antennae in the presence of (only) uncorrelated additive white Gaussian noise, maximum ratio combining provides the best signal to noise ratio.

In these systems, a communications base station can exploit antenna gain and beam forming because it has adequate power for the control algorithms. However, for a harvesting application, there is no power for an adaptive circuit that guarantees coherent aggregation of power from multiple antennae with unknown phase differences. This makes it difficult to exploit beam formers and rectifiers that can adaptively and optimally merge the power from multiple differently phased inputs without requiring energy beyond the received energy.

The problem arises for energy harvesting systems that power is not available to operate a circuit to adaptively adjust the phase or amplitude of the incoming RF signals. The output power of these circuits can be less than the power that the circuit draws from its power supply, which makes them useless for energy harvesting.

SUMMARY OF THE INVENTION

The invention is defined by the claims.

According to an aspect of the invention, there is provided a circuit for use in a power harvesting system, comprising:

a first antenna having a first terminal coupled to a summing node through an input capacitor, and a second terminal, the second terminal coupled to a summing node through a first diode;

a second antenna having a first terminal coupled to the second terminal of the first antenna and a second terminal coupled to the summing node through a second diode, wherein the summing node is coupled to an output node through an output diode, wherein an output capacitor is provided at the output node.

These circuit components form part of the RF to DC rectifier circuit of a power harvesting system. In this way, the invention provides a multi-antenna rectifier, which implements combination of antenna signals as part of the rectification. This enables antenna signals to be added without cancelling, and avoids the need for beam steering which may not be possible in a power harvesting application.

Note that the term "coupled" may indicate a direct connection (through a low resistance connection) or through other components. For example, an antenna matching circuit may be provided between the first and second antennae and the input capacitor and diodes of the circuit.

The first, second and output diodes, and the input and output capacitors may for example form a voltage doubling circuit.

The circuit can thus be implemented as a modification to a known voltage doubling circuit, to receive multiple rectified antenna signals.

The circuit may further comprise a further voltage doubling circuit coupled to the output node. Two voltage doubling stages can thus be used to power the load with a higher voltage.

In a further embodiment:

the first terminal of the first antenna is coupled to a second summing node through a third diode;

the first terminal of the second antenna is coupled to the second summing node through a fourth diode;

the second summing node is coupled to the output node or a second output node through a second output diode; and the circuit comprises a second input capacitor which is coupled between the second summing node and the second terminal of the second antenna.

This provides two circuits (the second circuit is the third, fourth and second output diode, and the second input capacitor) which are essentially equivalent, these two circuits can harvest energy from different RF phases in the first antenna and the second antenna, and in total more energy can be harvested thereby enabling a higher energy harvest ratio to be provided. The second circuit can be considered to be an auxiliary circuit.

In one implementation, the two circuits function to charge the same output capacitor. In this case, the third, fourth and second output diodes, and the second input capacitor may be considered to form an auxiliary voltage doubling circuit. In this embodiment, the output capacitor can provide a higher voltage to power the load.

In another implementation, the second circuit provides its output to a second output capacitor. The first output node and the second output node in one example are for outputting voltages with same polarity, and the first terminal of the first antenna is coupled to the second summing node through the forwarded third diode, and the first terminal of the second antenna is coupled to the second summing node through the forwarded fourth diode.

This arrangement provides two circuits, one for each of two antennae, and each with their own output capacitor. The two circuits may be identical but with the one antenna terminal from one circuit cross connected into the other.

Alternatively, the output of one circuit can be a positive voltage and the output of the other circuit can be a negative voltage. The output node and the second output node are then for outputting voltages with opposite polarity with respect to each other, and the first terminal of the first antenna is coupled to the second summing node through the reversed third diode, and the first terminal of the second antenna is coupled to the second summing node through the reversed fourth diode.

The two output capacitors can be connected together at a grounded node, and the connection between the two antennae can also be grounded.

A voltage doubling circuit adapted for doubling the voltage may be provided at the output node of the first circuit, and the second (auxiliary) circuit when used. This provides two concatenated voltage doublers for each circuit, for example one for each polarity.

The circuit may further comprise at least one further antenna, wherein the or each further antenna has a first terminal coupled to the second terminal of the preceding antenna, and a second terminal coupled to the summing node through a respective diode. The circuit can thus easily be scaled for three or more antennae to meet the increased requirement of energy harvesting. A more widely applicable circuit is thus provided by this embodiment of the invention.

In a second aspect of the invention, an electronic device that is powered by inductive, capacitive or electromagnetic power transfer, such as a sensor node, can use a circuit of the invention. The circuit is of particular interest for passive sensor nodes, such as passive RFID tags. The sensor node may comprise a power transfer channel which is used to exchange data.

Another aspect provides a power harvesting method, combining multiple antenna signals, comprising:

coupling a first terminal of a first antenna to a summing node through an input capacitor;

for each of the multiple antenna:

coupling a first antenna terminal of each subsequent antenna with a second terminal of the respective previous antenna, and providing a signal from the second antenna terminal of each antenna to the summing node of a voltage doubling circuit through a respective diode.

This method provides the combination of energy from two (or more) antennae as part of the rectification process.

The power harvesting method may comprise:

performing the method for a first polarity power supply; and performing the method for a second, opposite, polarity power supply.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a circuit for use in a power harvesting system, in which the signals from at least first and second antennae are provided to a summing node through a respective diode. The summing node is coupled to an output node through an output diode, and an output capacitor is provided at the output node. These circuit components form part of the RF to DC rectifier circuit of a power harvesting system, and in particular a modified diode based voltage doubling circuit. In this way, the combination of antenna signals is implemented as part of the rectification. This enables antenna signals to be added without cancelling.

There are basic solutions to the problem of combining multiple antenna signals.

Figure 1:
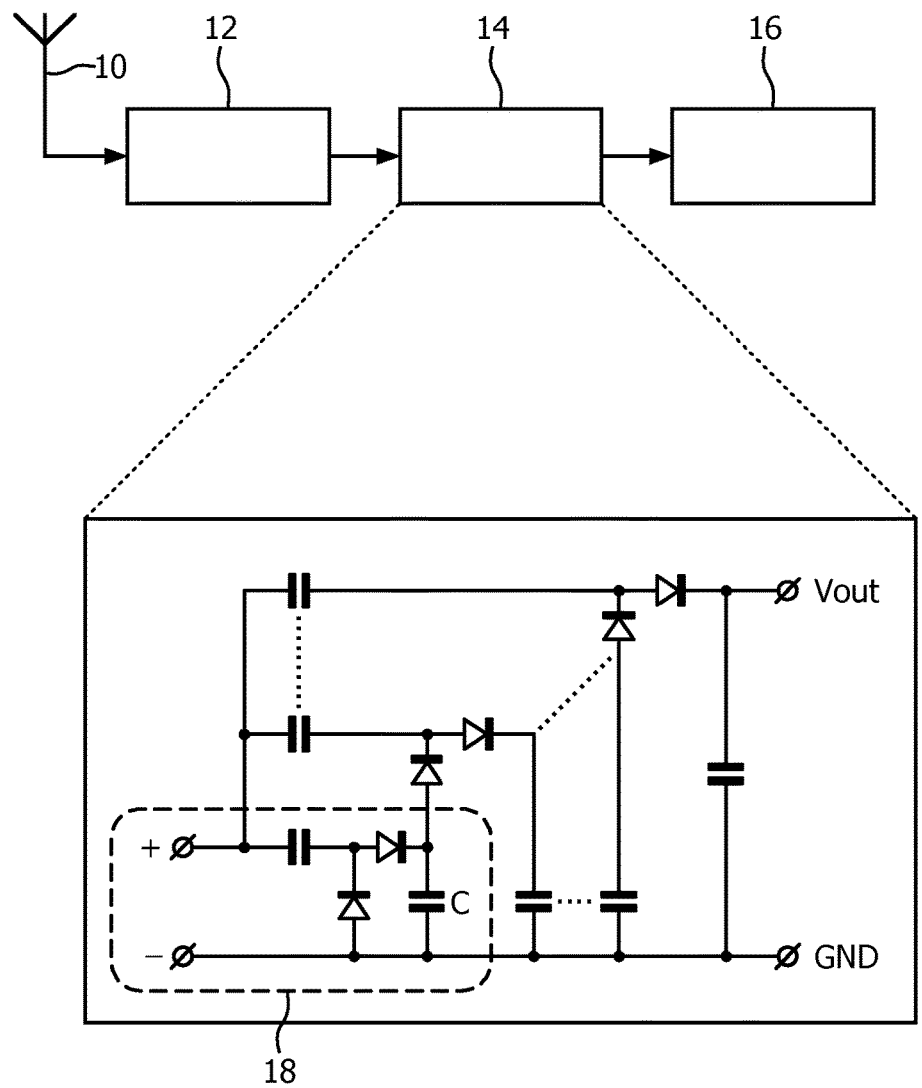
FIG. 1 shows a known power harvesting circuit.
Figure 2A:
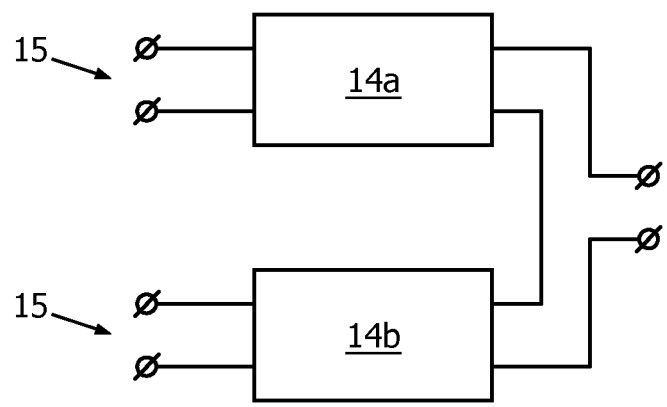
FIG. 2 shows two possible ways to combine multiple antenna signals.

FIG. 2(a) shows two antenna connections 15, each provided to a respective Rectifier 14a, 14b before being combined in series. Rectifiers 14a, 14b respectively connect to different antennae. This approach of rectifying then combining leads to inefficiency because the input signal strength to each rectifier is low.

Figure 2B:
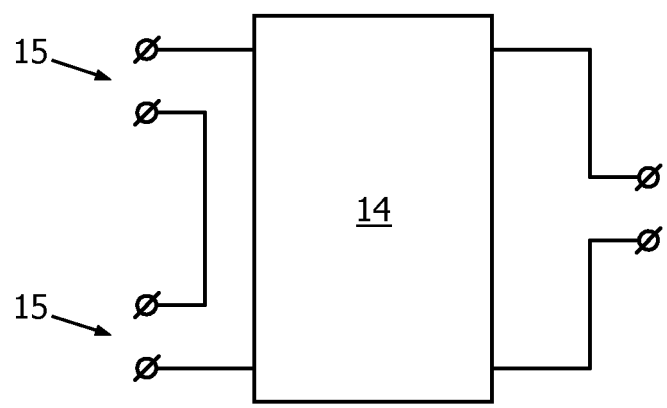

FIG. 2(b) shows two antenna connections 15, coupled in series before being provided to a single rectifier 14. The two antenna connections 15 respectively connect to different antennae. The aim is to obtain a voltage that is two times larger (or more for more antennae) but this only works if the signals have the same phase. If signals arrive at the antennae with phase delays further measures are needed. In an extreme situation, the signals arriving at the different antennae are opposite phase, and these signals will cancel each other. This approach of combining then rectifying thus cannot avoid nulls during which the rectifier is insensitive to the incoming signals.

The invention is directed to the problem of ensuring that the input voltages are as high as possible before being offered to the rectifying diode, particularly when handling multiple antenna signals. The approach of the invention is to combine multiple antenna signals as part of the rectification but in a way which avoids signal cancellation problems.

In this way, the system can be used for multiple antennae with arbitrary (i.e. unknown) phases between their received signals.

Figure 3:
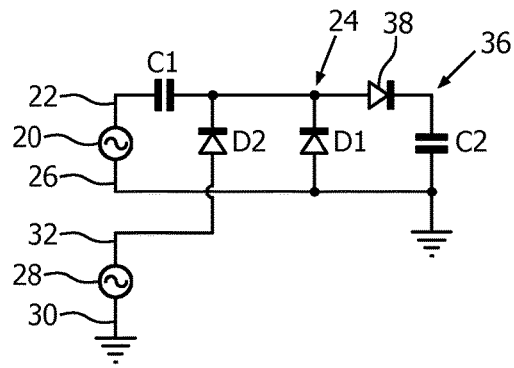
FIG. 3 shows a first example of circuit in accordance with the invention.

FIG. 3 shows the basic implementation of a circuit in accordance with the invention. The circuit is essentially the combination of the multiple antennae and part of the RF-DC converter 14.

The circuit comprises a first antenna 20 having a first terminal coupled 22 to a summing node 24 through an input capacitor C1, and a second terminal 26, the second terminal 26 coupled to the summing node 24 through a first diode D1.

A second antenna 28 has a first terminal 30 coupled to the second terminal 26 of the first antenna (i.e. ground in the example shown) and a second terminal 32 coupled to the summing node 24 through a second diode D2.

The summing node 24 is coupled to an output node 36 through an output diode 38, and an output capacitor C2 is provided at the output node.

The circuit of FIG. 3 essentially comprises a voltage doubling circuit but with multiple antennae feeding to a summing node within the circuit. The antenna signals can be added without cancelling.

There are at least two antenna signals. The purpose of the diodes D1 and D2 is to ensure that the first capacitor C1 is charged to a maximum available voltage, so that the antenna signals do not cancel out. This is effective to exploit the fourth power effect explained above.

The circuit is designed to operate without knowledge of the phase difference between antenna signals. One antenna connects to one side of the main capacitor C1, and the other antenna connects through a diode to a summing node at the other side of the capacitor C1. As explained below, further antennae can also be coupled to this summing node, through their own respective diodes. The diodes leading to this summing node mean that the capacitor C1 is charged to the level that is determined by the diode that couples to the highest voltage.

For some phase situations, there may be zero phase difference between the signal provided to the summing node from an additional antenna and the first side of the capacitor C1. In this case, the additional antenna does not provide an additional contribution, but signal cancellation is avoided and there is still scavenging from one antenna.

In the case of FIG. 3, if the two antenna signals are in phase, the circuit effectively scavenges from one antenna only. However, if the signals are opposite phase, there is constructive addition of the signals giving improved scavenging efficiency.

Thus, the arrangement prevents signal cancellation, but can also exploit good coherent signal addition if the input phase relationships are appropriate. The circuit can be optimised if it is known that the the multiple antennae will give rise to generally similar phase signals, or if it is known that the antennae will give rise to generally opposite phase signals. For example, the circuit of FIG. 3 will be more efficient for opposite phase antenna signals. A simple inversion of the antenna connections 32,30 will make the circuit more efficient for antenna signals with the same phase.

The circuit of FIG. 3 can be considered to be a basic building block which can be used within more elaborate circuits.

Figure 4:
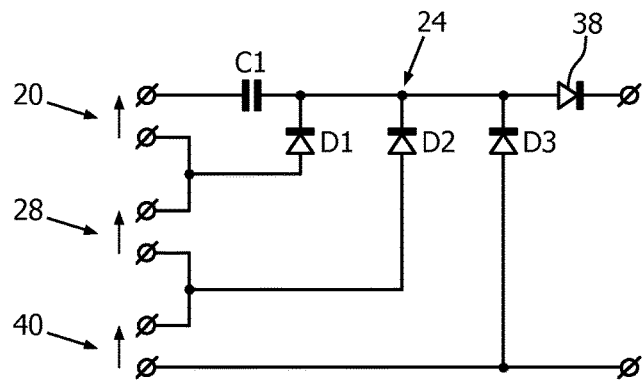
FIG. 4 shows a second example of circuit in accordance with the invention.

As mentioned above, the approach for combining two antenna signals as in FIG. 3 can also be extended to three or more antennae. FIG. 4 shows an equivalent approach for three antennae 20,28,40.

The third antenna 40 (and each additional antenna) has a first terminal 41 coupled to the second terminal of the preceding antenna, and a second terminal 42 coupled to the summing node 24 through a respective diode D3.

In more general terms, more antennae can be integrated, wherein the or each further antenna has a first terminal coupled to the second terminal of the preceding antenna, and a second terminal coupled to the summing node through a respective diode. The circuit can thus form a cascading array of diodes which connect the antenna signals to the summing node.

Figure 5:
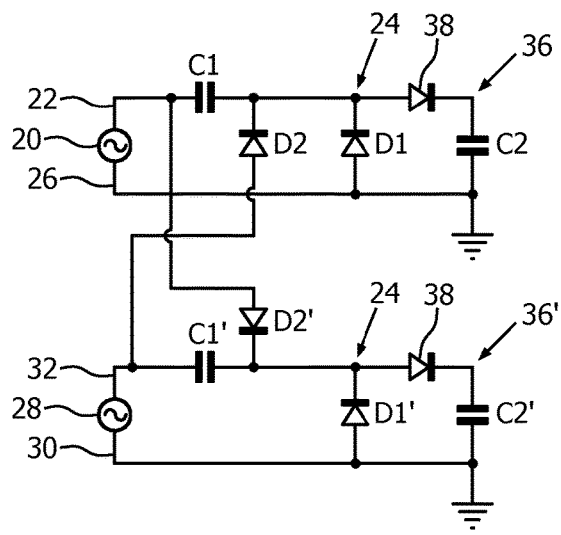
FIG. 5 shows a third example of circuit in accordance with the invention.

FIG. 5 shows an implementation with two of the circuits of FIG. 3, in which each circuit has its own input and output capacitor. The second circuit is shown with the same reference numbers as the first circuit, but with a prime notation (e.g. C1'). Each circuit combines the antenna signal from both antennae, so that two antenna signals couple into both circuits. There are thus two voltage doublers, and each one benefits from having both antenna signals combined. The use of two circuits enables an increased voltage to be generated. The two outputs (on capacitors C2 and C2') in this example both have the same polarity.

In this case, the first terminal of the first antenna is coupled to a second summing node 24' through a third diode D2', the first terminal 30 of the second antenna is coupled to the second summing node 24' through a fourth diode D1' and the second summing node 24' is coupled to a second output node 36' through a second output diode 38'. The second circuit comprises a second input capacitor C1' which is coupled between the second summing node 24' and the second terminal 32 of the second antenna.

The second circuit forms an auxiliary voltage doubling circuit.

In the circuit of FIG. 5, separate output capacitors are provided.

Figure 6:
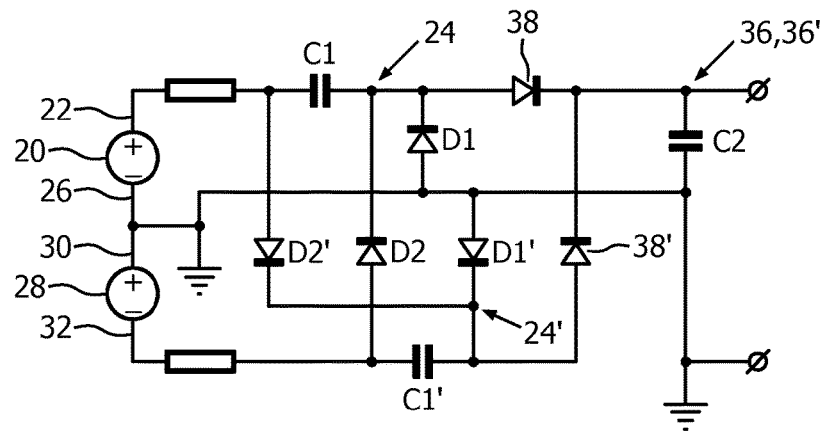
FIG. 6 shows a fourth example of circuit in accordance with the invention.

FIG. 6 shows the same circuit as FIG. 5, but with a shared output capacitor C2. Resistors are shown in the circuit to represent the antenna impedances, for the purposes of circuit simulation only. Optionally, impedance matching may be provided between the antennae and the rectifier, for example using a transformer.

Figure 7:
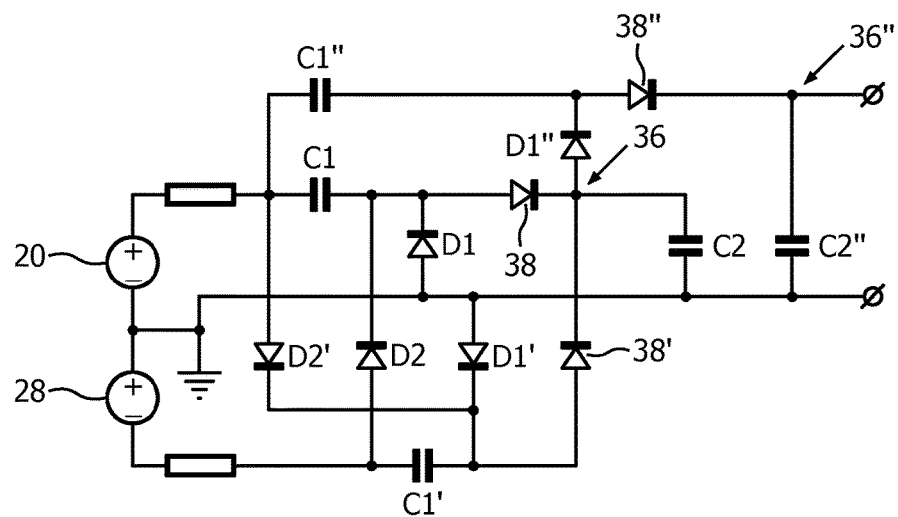
FIG. 7 shows a fifth example of circuit in accordance with the invention.

FIG. 7 shows a modification to the circuit of FIG. 6 in which a voltage doubling circuit is coupled to the output node 36, adapted for doubling the voltage at the output node.

This voltage doubling circuit is of the same general type as the circuit of FIG. 3 (but with only one input to the summing node) and comprises an input capacitor C1", the voltage doubling diodes D1" and 38" and output capacitor C2" coupled to output node 36". This enables a higher output voltage to be generated.

The circuit of FIG. 5 has two output capacitors but they store voltage of the same polarity. An alternative is to provide one circuit for a positive voltage and one circuit for a negative voltage. An example is shown in FIG. 8.

The same references are used as in FIG. 5. The second circuit is for generating a signal with opposite polarity to the first. For this reason, the diodes D1', D2', 38' are oriented oppositely with respect to the orientation in FIG. 5.

Figure 8:
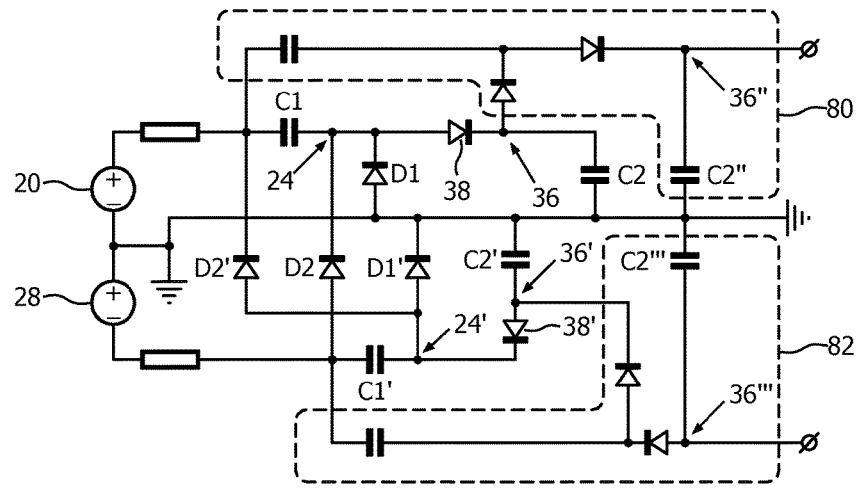
FIG. 8 shows a sixth example of circuit in accordance with the invention.

FIG. 8 also shows that each circuit has a voltage doubling circuit, with voltage doubling circuit 80 for the first circuit and voltage doubling circuit 82 for the second circuit.

In this case, the second circuit again comprises:

a second circuit input capacitor C1' to which the second terminal 32 of the second antenna is coupled;

a second circuit summing node 24';

a first diode D1' of the second circuit, wherein the second circuit summing node 24' is coupled to the first terminal of the second antenna through the first diode of the second circuit;

a second diode D2' of the second circuit, wherein the second circuit summing node 24' is coupled to the first terminal of the first antenna through the second diode D2' of the second circuit;

a second circuit output diode 38', wherein a second circuit output node 36' is coupled to the second circuit summing node 24' through the second circuit output diode; and a second circuit output capacitor C2' provided at the second circuit output node.

The voltage doubling circuits 80,82 provide two output capacitors, C2" and C2''' on which voltages are stored, at output nodes 36" and 36''', with opposite polarity with respect to each other.

The examples above provide a voltage from the combined antennae on an output capacitor or on multiple output capacitors.

An alternative is to provide the output voltages on respective capacitors, but with the correct polarity so that the capacitors can be connected in series.

Figure 9:
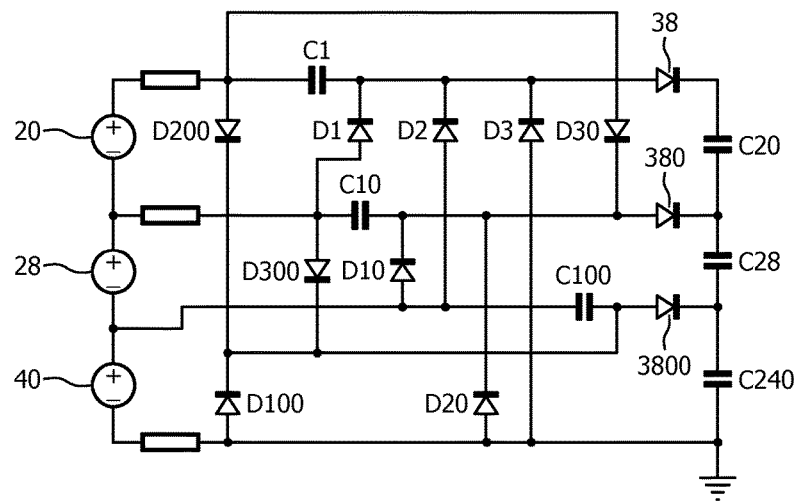
FIG. 9 shows a seventh example of circuit in accordance with the invention.

FIG. 9 shows this approach.

The basic building block is again the multiple input voltage doubler defined by D1, D2, C1 and 38. There are three antennae so that the first circuit also has diode D3. The first circuit stores a voltage on output capacitor C20 (for the first antenna 20).

The second antenna 28 has its own multiple input voltage doubler defined by C10, D10, D20, D30 and 380. The second circuit stores a voltage on output capacitor C28 (for the second antenna 28).

The third antenna 40 has its own multiple input voltage doubler defined by C100, D100, D200, D300 and 3800. The second circuit stores a voltage on output capacitor C40 (for the third antenna 40).

There are thus three equivalent circuits of the type explained above, each one of which receives all three antenna signals at their summing node. The various diodes and their orientations ensure that the combined antenna signals are stored on their respective capacitors with the appropriate polarity, so that the three output capacitors can be stacked in series. The basic circuit of FIG. 4 is essentially copied three times such that each output capacitor is charged from the highest input voltage difference.

The invention can also be considered as a method of power harvesting, which combines multiple antenna signals. A first terminal of a first antenna is coupled to a summing node through an input capacitor. For each of the multiple antennae a first antenna terminal of each subsequent antenna is coupled with a second terminal of the respective previous antenna, and a signal from the second antenna terminal of each antenna is provided to the summing node of a voltage doubling circuit through a respective diode.

The system is configured such that the combined system can always retrieve energy regardless of the angle of arrival.

The invention can be applied to any low power device which is to operate by harvesting power. Sensor nodes are one example, for example for healthcare or for lighting and building management. RFID tags may use the approach, and they may be made smaller and avoid the need for external antennae.

Small RFID devices may for example be injected into a 3D printed object and act as proof of authenticity or to link the object to a particular software application.

A sensor node using the power harvesting circuit may comprise a power transfer channel which is used to exchange data. This is for example known from the paper "A 71 GHz RF Energy Harversting Tag with 8% Efficiency for Wireless Temperature Sensors in 65 nm CMOS" of Hao GAO et. al., published in the Radio Frequency Integrated Circuits Symposium (RFIC), 2013 IEEE, 2-4 Jun. 2013, pages: 403-406.

The circuits above are diode circuits. The diodes may be implemented as diode-connected transistors. Transistors may be bipolar or field effect transistors, and other non-linear semiconductor components may be used.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A circuit for use in a power harvesting system, comprising:
   a first antenna having a first terminal coupled to a summing node through an input capacitor, and a second terminal, the second terminal coupled to the summing node through a first diode;
   a second antenna having a first terminal coupled to the second terminal of the first antenna and a second terminal coupled to an interconnection between the input capacitor and the summing node through a second diode,
   wherein the summing node is coupled to an output node through an output diode, wherein an output capacitor is provided at the output node;
   wherein said second terminal of the second antenna is adapted to provide a signal in opposite phase with a signal provided at the first terminal of the first antenna.

2. A circuit as claimed in claim 1, wherein the first terminal and the second terminal of the second antenna is adapted to be inverted for antenna signals with the same phase in the first antenna and the second antenna.

3. A circuit as claimed in claim 2, wherein the first, second and output diodes, and the input and output capacitors form a voltage doubling circuit, and the circuit further comprising a further voltage doubling circuit coupled to the output node and to the first terminal of the first antenna or the second terminal of the second antenna, adapted for doubling the voltage at the output node.

4. A circuit as claimed in claim 1, wherein:
   the first terminal of the first antenna is coupled to a second summing node through a third diode;
   the first terminal of the second antenna is coupled to the second summing node through a fourth diode;
   the second summing node is coupled to the output node or a second output node through a second output diode; and
   the circuit comprises a second input capacitor which is coupled between the second summing node and the second terminal of the second antenna.

5. A circuit as claimed in claim 4, wherein the second summing node is coupled to the second output node through the second output diode and a second circuit output capacitor provided at the second output node.

6. A circuit as claimed in claim 5, wherein the third, fourth and second output diodes, and the second input capacitor form an auxiliary voltage doubling circuit.

7. A circuit as claimed in claim 6, further comprising a voltage doubling circuit adapted for doubling the voltage at the second output node.

8. A circuit as claimed in claim 5, wherein:
   the output node and the second output node are for outputting voltages with opposite polarity with respect to each other and the first terminal of the first antenna is coupled to the second summing node through the reversed third diode, and the first terminal of the second antenna is coupled to the second summing node through the reversed fourth diode; or
   the first output node and the second output node are for outputting voltages with same polarity, and the first terminal of the first antenna is coupled to the second summing node through the forwarded third diode, and the first terminal of the second antenna is coupled to the second summing node through the forwarded fourth diode.

9. A circuit as claimed in claim 1, further comprising at least one further antenna,
   wherein the or each further antenna has a first terminal coupled to the second terminal of the preceding antenna, and a second terminal coupled to the summing node through a respective diode.

10. An electronic device that is powered by inductive, capacitive or electromagnetic power transfer, such as a sensor node, comprising a circuit as claimed in claim 1.

11. A power harvesting method, combining multiple antenna signals, comprising:
    coupling a first terminal of a first antenna to a summing node through an input capacitor;
    for each of the multiple antennae:
    coupling a first antenna terminal of each subsequent antenna with a second terminal of the respective previous antenna, and
    providing a signal from the second antenna terminal of each antenna to an interconnection between the input capacitor and the summing node of a voltage doubling circuit through a respective diode wherein said second terminal of the second antenna is adapted to provide a signal in opposite phase with a signal provided at the first terminal of the first antenna.

12. A method as claimed in claim 11, further comprising performing a further voltage doubling of the voltage at the output of the voltage doubling circuit, and/or
    inverting the first terminal and the second terminal of the second antenna for antenna signals with the same phase in the first terminal of the first antenna and the second terminal of the second antenna.

13. A method as claimed in claim 11, further comprising providing a signal from a first antenna terminal of each antenna signal to a summing node of a second voltage doubling circuit through a respective diode.

14. A method as claimed in claim 13, further comprising performing a further voltage doubling of the voltage at the output of the second voltage doubling circuit.

15. A power harvesting method, comprising:
    performing the method of claim 11 for a first polarity power supply.

16. A power harvesting method, performing the method of claim 11, for a second, opposite, polarity power supply.

* * * * *